United States Patent [19]

Ito et al.

[11] Patent Number: 5,001,019
[45] Date of Patent: Mar. 19, 1991

[54] JOINED CERAMIC AND METAL

[75] Inventors: Masaya Ito; Katsumi Miyama, both of Aichi, Japan

[73] Assignee: NGK Spark Plug Co., Ltd., Aichi, Japan

[21] Appl. No.: 411,974

[22] Filed: Sep. 21, 1989

[30] Foreign Application Priority Data

Sep. 21, 1988 [JP] Japan .................. 63-237434
Aug. 22, 1989 [JP] Japan .................. 1-215299

[51] Int. Cl.⁵ .......................... B32B 15/04
[52] U.S. Cl. .................... 428/621; 428/627; 428/632; 428/673; 416/241 B; 123/90.51
[58] Field of Search ............. 428/621, 627, 632, 670, 428/673; 420/503, 505, 580; 416/241 B; 123/90.51; 228/263.12

[56] References Cited

U.S. PATENT DOCUMENTS

| | | | |
|---|---|---|---|
| 4,532,190 | 7/1985 | Kanbe et al. | 428/627 |
| 4,559,277 | 12/1985 | Ito | 428/632 |
| 4,604,328 | 8/1986 | Mizuhara | 420/580 |
| 4,606,978 | 8/1986 | Mizuhara | 420/580 |
| 4,657,825 | 4/1987 | Kanda et al. | 428/627 |
| 4,704,338 | 11/1987 | Landingham et al. | 428/627 |
| 4,711,386 | 12/1987 | Mizuhara | 428/627 |
| 4,723,862 | 2/1988 | Ito et al. | 416/241 B |
| 4,801,067 | 1/1989 | Kondo et al. | 228/263.12 |
| 4,866,829 | 9/1989 | Oda | 416/241 B |

FOREIGN PATENT DOCUMENTS 351216  3/1957  Japan .
61-127674  6/1986  Japan .
275596  11/1987  Japan .

Primary Examiner—Theodore Morris
Assistant Examiner—George Wyszomierski
Attorney, Agent, or Firm—Sughrue, Mion, Zinn, Macpeak & Seas

[57] ABSTRACT

Joined ceramic and metal is characterized by ceramic and metal thermally joined through an intermediate layer. The intermediate layer is composed of 20-70% by weight of silver, 1-20% by weight of palladium, 10-60% by weight of nickel and 1-10% by weight of titanium. The joined ceramic and metal has sufficient joining strength both at normal temperature and at high temperature, because the joined ceramic and metal suffers little deterioration even at high temperature. Since the joined ceramic and metal has the characteristics of ceramic such as resistance to heat, corrosion and wear, it can be used for a structure operated at high temperature such as a gas turbine engine, a turbo charger rotor, a piston, a suction valve, and an exhaust valve.

16 Claims, 9 Drawing Sheets

JOINED CERAMIC AND METAL

BACKGROUND OF THE INVENTION

This invention relates to joined ceramic and metal having high strength.

A known method for joining ceramic and metal is metallic activation, in which solder is inserted between ceramic and metal, heated, then melted to join ceramic and metal. An alloy containing activated metal, such as silver-copper-titanium alloy (referred to as Ag-Cu-Ti alloy) or silver-copper-nickel-titanium alloy (Ag Cu-Ni-Ti alloy), is widely used as the solder. The solder can easily join ceramic and metal in low temperature range between 800° C. and 900° C. with high joining strength For another metallic activation, Japan Published Examined Patent Application 35-1216 and Japan Published Unexamined Patent Application 61-127674 disclose ceramic and metal joined through an intermediate solder member which is a combination of titanium (Ti) and an eutectic metal element such as nickel-titanium (Ni-Ti) alloy, nickel copper-titanium (Ni-Cu-Ti) alloy, or copper-titanium (Cu-Ti) alloy.

The intermediate solder member should strengthen the joining of ceramic and metal, but in the Ag-Cu-Ti alloy and the Ag-Cu-Ni-Ti alloy, the eutectic point of Ag-Cu alloy is as low as 780° C., and Cu is selectively oxidized. Accordingly, such an intermediate solder member cannot assure adequate joining strength at high temperature.

The Ni-Ti alloy, the Ni-Cu-Ti alloy, and the Cu-Ti alloy assure almost the same joining strength at high temperature as that at low temperature, but have the joining strength lower than that of Ag-Cu alloy due to their low wettability. Accordingly, the Ni-Ti, Ni-Cu Ti, and Cu-Ti alloys are unreliable, require a long time period for heat treatment, and are expensive to manufacture.

SUMMARY OF THE INVENTION

The object of the present invention is to provide a joined ceramic and metal having high reliability even at high temperature by improving a soldering alloy member used for the easy-to-operate metallic activation method.

This object is realized by joined ceramic and metal. The ceramic and the metal are thermally joined through an intermediate layer. After the ceramic and the metal are joined, the intermediate layer is composed of 20-70% by weight of silver (Ag), 1-20% by weight of palladium (Pd) 10-60% by weight of nickel (Ni), and 1-10% by weight of titanium (Ti).

Ag enhances the fluidity, wettability, and joining strength of the intermediate layer. When the content is lower than 20% by weight, Ag does not sufficiently produce such an effect. When the content exceeds 70% by weight, however, the heat resistance of the intermediate layer deteriorates.

Pd raises the melting point of the intermediate layer and decreases the whole vapor pressure Pd, thus, enhances the heat resistance, reliability, and wettability of the intermediate layer and prevents the metal joined to ceramic from becoming fragile. When the content of Pd is between 2 and 10% by weight, Pd produces this effect, thereby increasing the joining strength. When the content is lower than 1% by weight, Pd produces insufficient effect. When the content exceeds 20% by weight, the fluidity of the intermediate layer is decreased while ceramic and metal are joined through the intermediate layer, thereby adversely affecting the wettability of the intermediate layer.

Ni increases the heat resistance of the intermediate layer. When the content of Ni is between 20 and 50% by weight, Ni maximizes the heat resistance, and the joining strength at high temperature is increased. When the content is below 10% by weight, Ni produces insufficient effect. When the content exceeds 60% by weight, the fluidity of the intermediate layer is decreased while the intermediate layer joins ceramic and metal. The wettability of the intermediate layer is thus adversely affected.

Ti increases the wettability and joining strength of the intermediate layer. When the content of Ti is between 1.5 and 5% by weight, Ti maximizes its effect and strengthens the joining with ceramic. The effect becomes insufficient when the content is below 1% by weight. When the content exceeds 10% by weight, the joining strength is decreased.

When the intermediate layer contains Cu, Cu enhances the fluidity and wettability of the intermediate layer, and increases the joining strength of the intermediate layer on ceramic. The addition of Cu lowers the soldering temperature, decreases residual stress produced in ceramic during cooling, and allows a designer the choice of a variety of metals to join. When the content of Cu exceeds 10% by weight, the resistance to heat and oxidation of the intermediate layer is decreased. The content should be 10% by weight or less.

Figure 5:
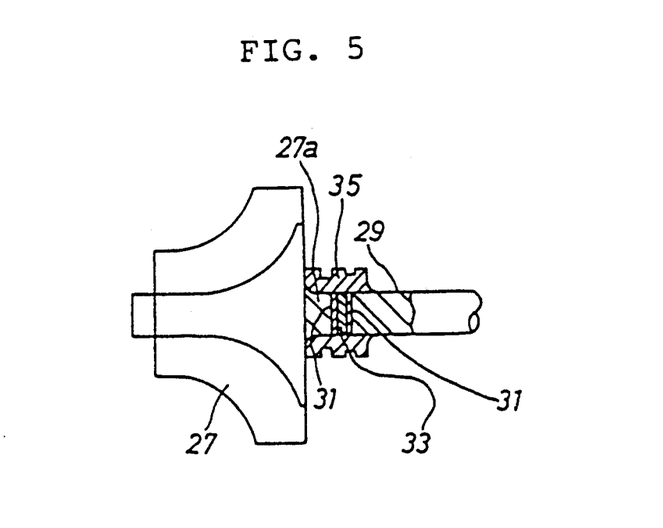
FIG. 5 is a partially sectional view of a turbo charger rotor having the structure of the present invention.

As shown in FIG. 5, such intermediate layer can be used for a turbo charger rotor. A ceramic shaft 27a of a ceramic turbine wheel 27 engages a metallic journal 29 via the intermediate layer of the present invention comprising two Ni plates 31 and a tungsten (W) plate 33. A metallic sleeve 35 is located around the intermediate layer. The turbo charger rotor can be thus resistive to heat and durable.

This intermediate layer can be manufactured by known methods as follows:

1. insert alloy with a fixed composition between ceramic and metal, heat and melt to join them;
2. place foil of a fixed substance on a joining surface, or galvanize, evaporate, or coat the surface with the fixed substance, subsequently insert alloy containing substances except the fixed substance between ceramic and metal, heat and melt to elute the fixed substance into the alloy;
3. use metal containing the fixed substance and elute the fixed substance into melted alloy in the same way as (2);
4. after joining, thermally diffuse the fixed substance into an alloy of solid phase, instead of elution;
5. mix powdered metals to prepare paste and apply the paste onto the joining end face of ceramic or metal; or
6. combine above methods 1 through 5.

Other methods than the above-specified can be used. However, after the intermediate layer is manufactured, it should have the composition of the present invention.

The composition of the intermediate layer prepared through elution or thermal diffusion can be determined, for example, by using an X-ray microanalyzer (XMA), an electronic probe microanalyzer (EPMA), or an energy-dispersing type X-ray analysis (EDX).

The intermediate layer can join oxide ceramic such as alumina, zirconia, and titania, and it can also join nonoxide ceramic such as silicon nitride, sialon, and silicon carbide.

The intermediate layer can join iron (Fe), carbon steel, nickel, and other metals. However, metal has a different coefficient of thermal expansion from that of ceramic, and a residual thermal stress is produced in ceramic when metal joins ceramic. Accordingly, Ni, iron-nickel (Fe-Ni) alloy, and iron-nickel-cobalt (Fe-Ni-Co) alloy are desirable. Fe-Ni alloy and Fe-Ni-Co alloy include 42-alloy, kovar, invar, superinvar and incoloy.

Figure 6:
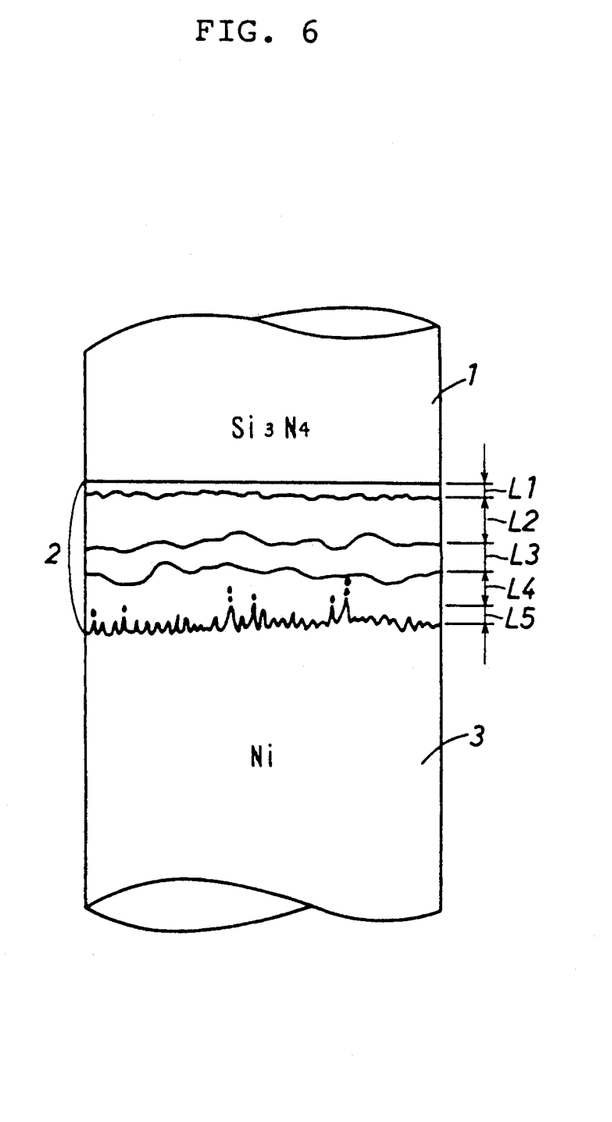
FIG. 6 is a cross sectional view showing an intermediate layer which has joined ceramic and metal.

As shown in FIG. 6, after the intermediate layer joins an $Si_3N_4$ sintered body 1 and a Ni plate 3, the intermediate layer comprises layers L1 through L5. The layers L1 through L5 are formed according to the configuration, structure and composition that the intermediate layer had before joining the $Si_3N_4$ sintered body 1 and the Ni plate 3, and according to the configuration, structure and composition of the $Si_3N_4$ sintered body 1 and the Ni plate 3. The composition for the intermediate layer is specified by averaging the compositions of the layers L1 through L5.

DESCRIPTION OF THE PREFERRED EMBODIMENTS

EMBODIMENT 1

Figure 1:
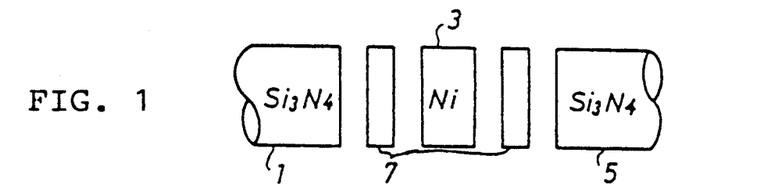
FIG. 1 is a partially sectional view of a first embodiment showing one application of the present invention.

As shown in FIG. 1, intermediate members 7 are inserted, respectively, between an $Si_3N_4$ body 1 and a Ni plate 3, and between the Ni plate 3 and an $Si_3N_4$ body 5. The $Si_3N_4$ bodies 1 and 5, which are gas-pressure sintered silicon nitride bodies, are 8 mm in diameter and 20 mm long. The Ni plate 3 is 8 mm in diameter and 0.25 mm thick. The intermediate member 7, the $Si_3N_4$ sintered bodies 1 and 5 and the Ni plate 3 are heated to join each other by a vacuum of $10^{-4}$ torr through $10^{-5}$ torr, according to the joining conditions in Table 1.

Figure 2A:
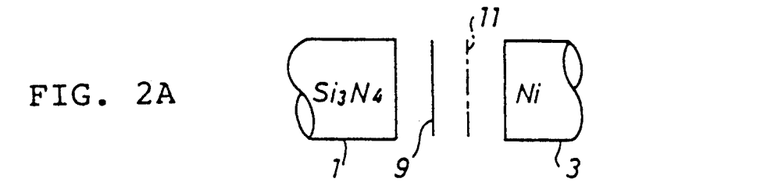
FIGS. 2A through 2F are partially sectional views showing various intermediate layers for the first embodiment.
Figure 2B:
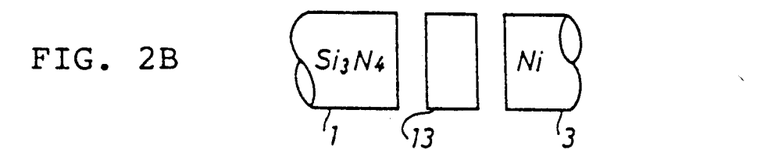
Figure 2C:
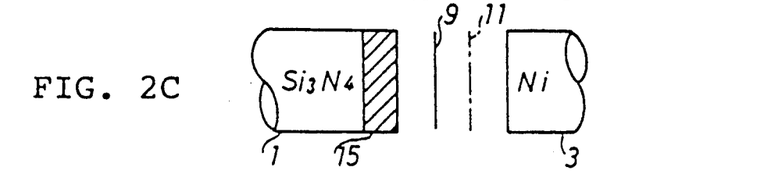
Figure 2D:
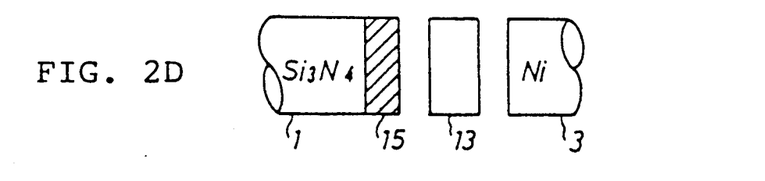
Figure 2E:
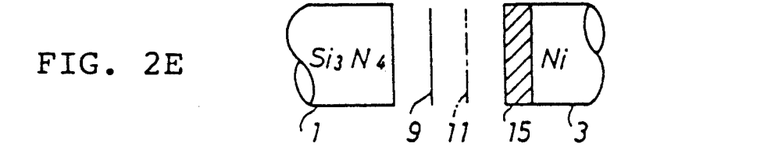
Figure 2F:
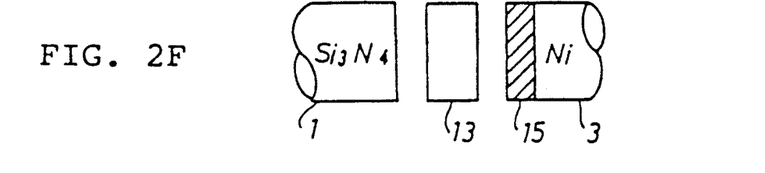

The intermediate members 7 have the following types of joining structure:

(1) as shown in FIG. 2A, the combination of a metallic foil 9 and a solder 11;

(2) as shown in FIG. 2B, an alloy 13 manufactured by melting with a fixed composition;

(3) a metallic layer 15 comprising fixed substances, being formed on the surface of the $Si_3N_4$ sintered body 1 or the Ni plate 3, and being combined with the intermediate member 7 of type (1) or (2), specifically, the metallic layer 15 formed on the $Si_3N_4$ sintered body 1 and (1) as the intermediate member 7 as shown in FIG. 2C the metallic layer 15 formed on the $Si_3N_4$ sintered body 1 and (2) as the intermediate member 7 as shown in FIG. 2D, the metallic layer 15 formed on the Ni plate 3 and (1) as the intermediate member 7 as shown in FIG. 2E, or the metallic layer 15 formed on the Ni plate 3 and (2) as the intermediate member 7 as shown in FIG. 2F; and (4) thermal diffusion in vacuum is applied to the intermediate layer having either one of the joining types (1) through (3).

Figure 3:
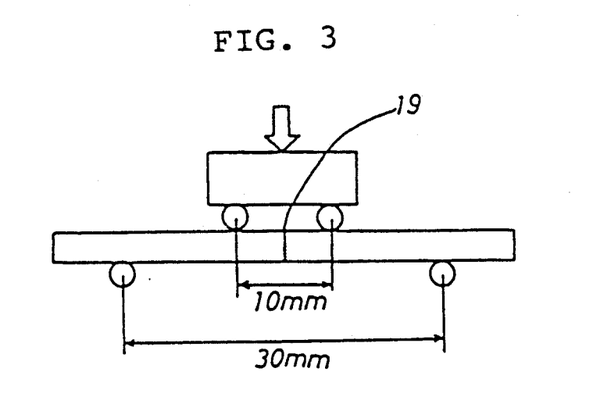
FIG. 3 is a diagram of a four-point bending test performed on the embodiments for the present invention.

The joining strength of the joined body can be measured as shown in FIG. 3. A 4 mm wide, 3 mm thick, and 40 mm long flexure test piece is cut out from the joined ceramic and metal. The distance between upper supports is 10 mm and the distance between lower supports is 30 mm, centering on a joining intermediate layer 19. A four-point bending test is performed on the test piece with the loading speed of 0.5 mm/min. at both room temperature and 400° C. The breaking strengths of three test pieces are measured and averaged as shown in Table 2.

To ascertain the composition of the joining intermediate layer, after measuring the breaking strengths, the test piece is cut perpendicular to the joining surface. Five points in the intermediate layer are selected at random and analyzed using the XMA. Ni composing the intermediate layer contains eluted substances from the Ni plate 3. The composition of the intermediate layer is shown in Table 1.

TABLE 1

| SAMPLE NO. | | INTERMEDIATE LAYER COMPOSITION (% BY WEIGHT) | | | | | JOINING CONDITIONS | | |
|---|---|---|---|---|---|---|---|---|---|
| | | Ag | Cu | Pd | Ni | Ti | HEATING CONDITION | JOINING TYPE | Notes: Numerals after element symbols refer to % by weight. |
| EM- | 1 | 64 | — | 1 | 30 | 5 | 1080° C. · 15 MIN. | (2) | Composition before melting: Ag72—Pd2—Ni18—Ti8 |
| BODI- | 2 | 45 | — | 20 | 30 | 5 | SAME AS ABOVE | (2) | Composition before melting: Ag52—Pd24—Ni18—Ti8 |
| MENT | 3 | 67 | — | 5 | 23 | 5 | 1060° C. · 15 MIN. | (1) | 5 micron thick Ti foil, 50 micron thick Ag—Pd solder |
| | 4 | 40 | — | 20 | 39 | 1 | 1040° C. · 5 MIN. | (4) | Thermal diffusion at 850° C. for 30 minutes is applied to joined (1) (1.5 micron thick Ti/50 micron thick Ag—Pd solder). |
| | 5 | 68 | — | 10 | 12 | 10 | 1060° C. · 5 MIN. | (1) | 10 micron thick Ti foil, 50 micron thick Ag—Pd solder |
| | 6 | 21 | 8 | 8 | 58 | 5 | 1100° C. · 30 MIN. | (2) | Composition before melting: |

TABLE 1-continued

| SAMPLE NO. | INTERMEDIATE LAYER COMPOSITION (% BY WEIGHT) | | | | | JOINING CONDITIONS | | Notes: Numerals after element symbols refer to % by weight. |
|---|---|---|---|---|---|---|---|---|
| | Ag | Cu | Pd | Ni | Ti | HEATING CONDITION | JOINING TYPE | |
| 7 | 45 | 10 | 10 | 30 | 5 | 1080° C. · 20 MIN. | (1) | Ag60—Pd10—Ni15—Ti5—Cu10 5 micron thick Ti foil, 50 micron thick Ag—Pd—Cu |
| 8 | 57 | 4 | 6 | 29.5 | 3.5 | 970° C. · 15 MIN. | (1) | 5 micron thick Ti foil, 100 micron thick Ag—Pd—Cu |
| 9 | 46 | 0.5 | 19 | 27 | 7.5 | 1080° C. · 10 MIN. | (3) | Electroless Ni plating on ceramic before joining (2) |
| 10 | 32.5 | — | 10 | 50 | 7.5 | 1040° C. · 10 MIN. | (1) | 5 micron thick Ti foil, 50 micron thick Ag—Pd solder |
| 11 | 48 | — | 6.5 | 38 | 7.5 | 1080° C. · 30 MIN. | (2) | Compositon before melting: Ag91—Pd5—Ti4 |
| 12 | 50 | 2 | 5 | 40 | 3 | 1080° C. · 15 MIN. | (4) | Thermal diffusion at 850° C. for 30 minutes is applied to joined (2). |
| COM-PAR-ISON DATA 1 | — | — | — | 70 | 30 | 1150° C. · 30 MIN. | — | 5 micron thick Ti foil |
| 2 | 63 | 25 | — | 10 | 2 | 900° C. · 15 MIN. | (1) | 5 micron thick Ti foil, 50 micron thick Ag—Cu solder |
| 3 | 29 | — | 28 | 42 | 1 | 1060° C. · 15 MIN. | (4) | Thermal diffusion at 850° C. for one hour is applied to joined (2). |
| 4 | 75 | — | 16 | 4 | 5 | 1020° C. · 5 MIN. | (2) | Composition before melting: Ag75—Pd20—Ti5 |
| 5 | 60 | — | 0.5 | 28.5 | 11 | 1040° C. · 15 MIN. | (2) | Composition before melting: Ag71—Pd2—Ni12—Ti15 |
| 6 | 50 | — | 31 | 18.5 | 0.5 | 1080° C. · 20 MIN. | (3) | Electroless Pd plating is applied on Ni before joining 1.5 micron thick Ti foil and Ag—Pd solder |
| 7 | 40 | 42 | 9 | 6 | 3 | 1040° C. · 5 MIN. | (1) | 5 micron thick Ti foil, 20 micron thick Cu, 50 micron thick Ag—Pd—Cu solder |
| 8 | 17 | 4 | 6 | 63 | 10 | 1100° C. · 30 MIN. | (1) | 20 micron thick Ti foil, 50 micron thick Ag—Pd—Cu solder |

TABLE 2

| SAMPLE NO. | ROOM TEMPERATURE | | 400° C. | |
|---|---|---|---|---|
| | STRENGTH (kg/mm²) | BROKEN POSITION | STRENGTH (kg/mm²) | BROKEN POSITION |
| EMBODIMENT 1 | 39 | C, C/S | 26 | C, C/S |
| 2 | 38 | SAME AS ABOVE | 30 | SAME AS ABOVE |
| 3 | 42 | SAME AS ABOVE | 30 | SAME AS ABOVE |
| 4 | 36 | SAME AS ABOVE | 29 | SAME AS ABOVE |
| 5 | 37 | SAME AS ABOVE | 26 | SAME AS ABOVE |
| 6 | 40 | SAME AS ABOVE | 31 | SAME AS ABOVE |
| 7 | 41 | SAME AS ABOVE | 30 | SAME AS ABOVE |
| 8 | 44 | SAME AS ABOVE | 32 | SAME AS ABOVE |
| 9 | 38 | SAME AS ABOVE | 28 | SAME AS ABOVE |
| 10 | 43 | SAME AS ABOVE | 35 | SAME AS ABOVE |
| 11 | 42 | SAME AS ABOVE | 34 | SAME AS ABOVE |
| 12 | 40 | SAME AS ABOVE | 29 | SAME AS ABOVE |
| COMPARISON DATA 1 | 17 | C/S | 16 | C/S |
| 2 | 41 | C, C/S | 22 | SAME AS ABOVE |
| 3 | 21 | SAME AS ABOVE | 12 | SAME AS ABOVE |
| 4 | 36 | SAME AS ABOVE | 17 | SAME AS ABOVE |
| 5 | 20 | SAME AS ABOVE | 10 | SAME AS ABOVE |
| 6 | 22 | SAME AS ABOVE | 11 | SAME AS ABOVE |
| 7 | 28 | SAME AS ABOVE | 10 | SAME AS ABOVE |
| 8 | 27 | SAME AS ABOVE | 14 | SAME AS ABOVE |

NOTES
C: ceramic
C/S: interface of ceramic and intermediate layer

As shown in Table 2, the joined ceramic and metal of the present embodiment has a sufficient joining strength both at room temperature and at high temperature. The interface between the ceramic and the intermediate layer is partly broken at 400° C., but cracks are mostly found inside the ceramic. The joined ceramic and metal of the present embodiment has high reliability. On the other hand, the joined ceramic and metal as the comparison data has insufficient strength at high temperature and has cracks on the interface between the ceramic and the intermediate layer. The joined ceramic and metal of the comparison data has less reliability than that of the present embodiment.

When the $Si_3N_4$ sintered body 1 joins the Ni plate 3 through the intermediate member 7 comprising the metallic foil 9 and the solder 11 as shown in FIG. 2A, an intermediate layer 2 has the cross section shown in FIG. 6. The intermediate layer 2 is composed of a rich Ti layer L1, a rich Ag layer L2, a rich Ni-Ti layer L3, a rich Ag layer L4 and a rich Ni layer L5. The layers L2 and L4 include Pd, Ni, and Ti, and sometimes Cu. The layer L3 includes Pd, and sometimes Cu. The layer L5 includes eluted Ni.

EMBODIMENT 2

Figure 4:
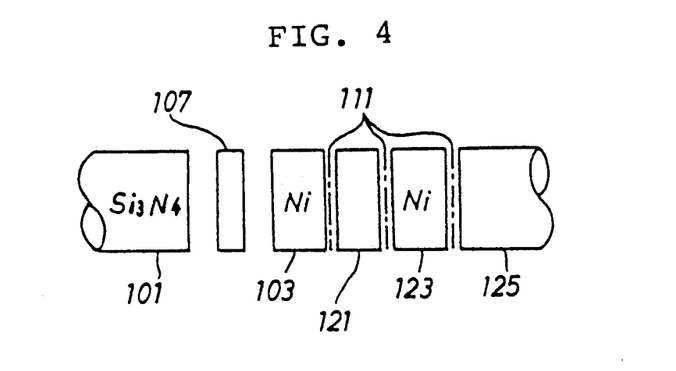
FIG. 4 is a partially sectional view of a second embodiment.

As shown in FIG. 4, in the same way as the first embodiment, an $Si_3N_4$ sintered body 101 joins a Ni plate 103 through an intermediate member 107. At the same time, the Ni plate 103 is joined with a W alloy 121, a Ni plate 123 and a stainless steel 125 in sequence with a silver solder 111. The W alloy 121 contains a small amount of Fe and Ni as assistants to sintering. The W alloy 121 is 8 mm in diameter and 2 mm thick, the Ni plate 123 is 8 mm in diameter and 0.25 mm thick, and the stainless steel 125, with a specification of SUS403 according to Japanese Industrial Standard (JIS), is 8 mm in diameter and 20 mm long. The silver solder 111, which is available on the market, has a specification of BAg8 according to JIS and is 8 mm in diameter and 0.03 mm thick.

The strength test is performed on the second embodiment in the same way as the first embodiment. Test results are shown in Table 3. The sample No 1 as comparison data in Table 3 uses 5 micron thick Ti foil instead of the silver solder.

Figure 14:
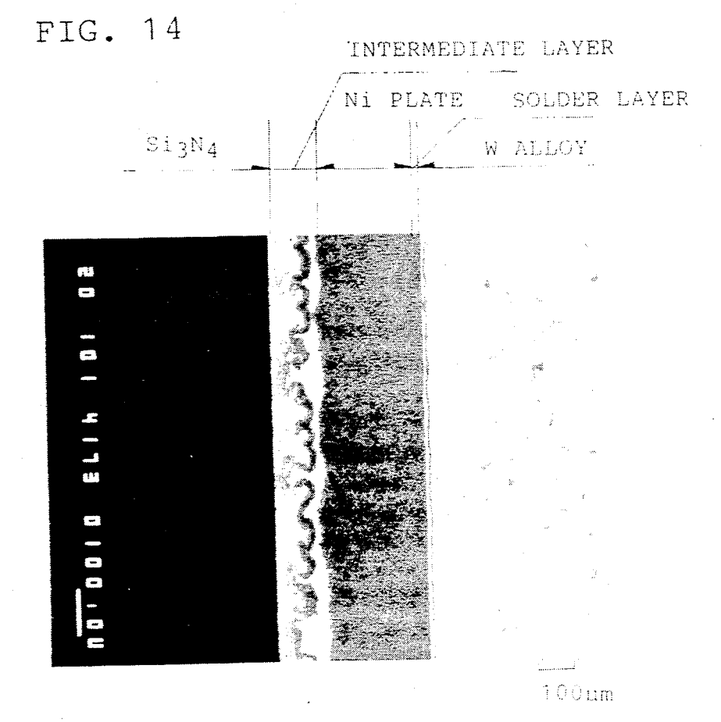
FIGS. 14 is a secondary electron image photo of the metallic composition of the intermediate layer.
Figure 15:
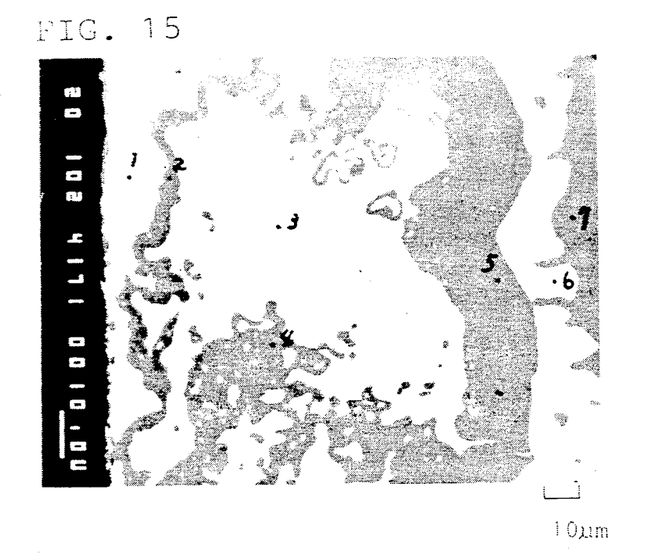
FIG. 15 is an enlarged view of FIG. 14.
Figure 16:
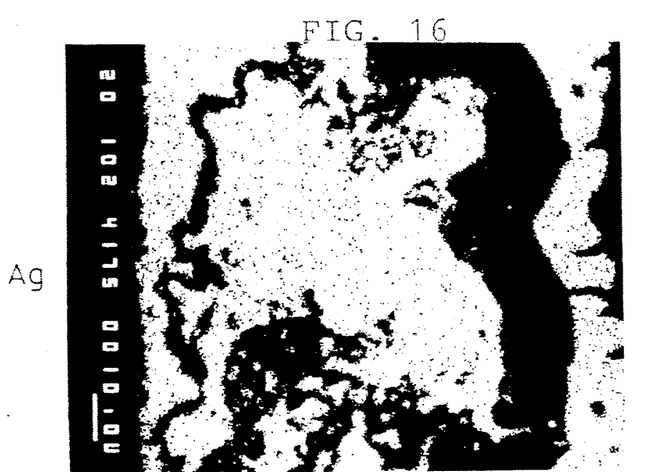
FIGS. 16 through 20 are characteristic X-ray image photos showing the distribution of Ag, Ni, Ti, Pd and Cu in the intermediate layer, respectively.
Figure 17:
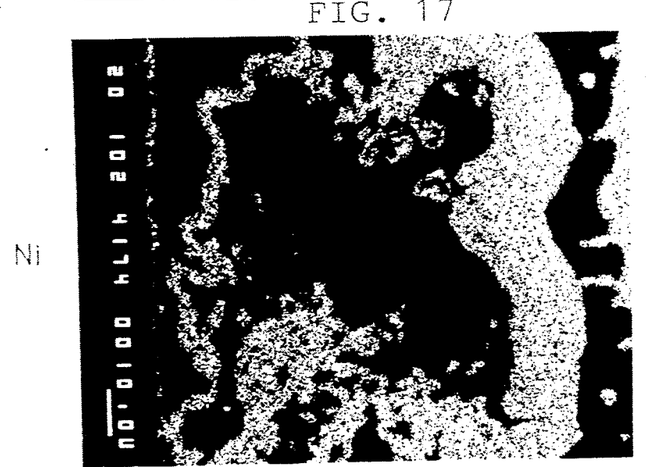
Figure 18:
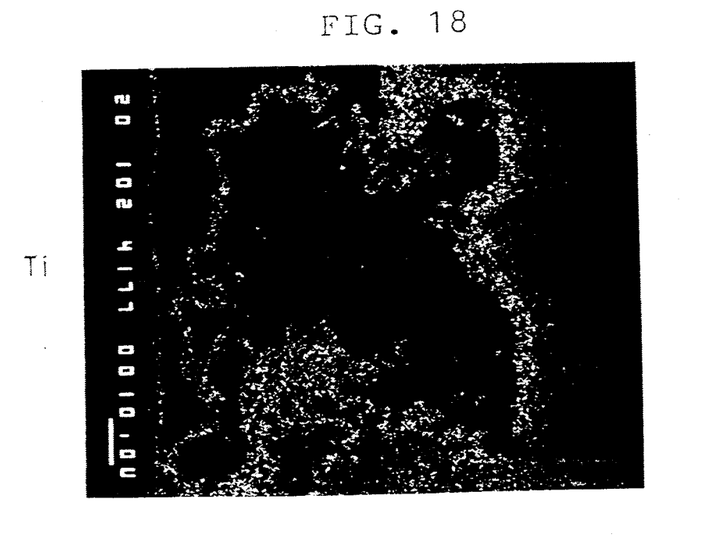
Figure 19:
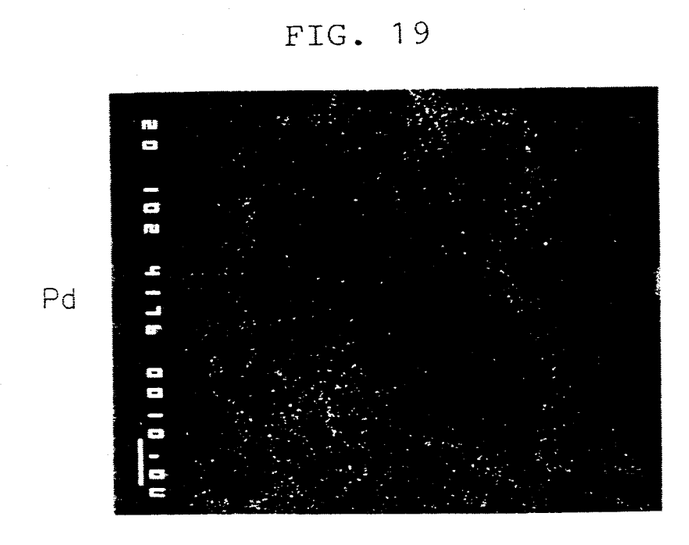
Figure 20:
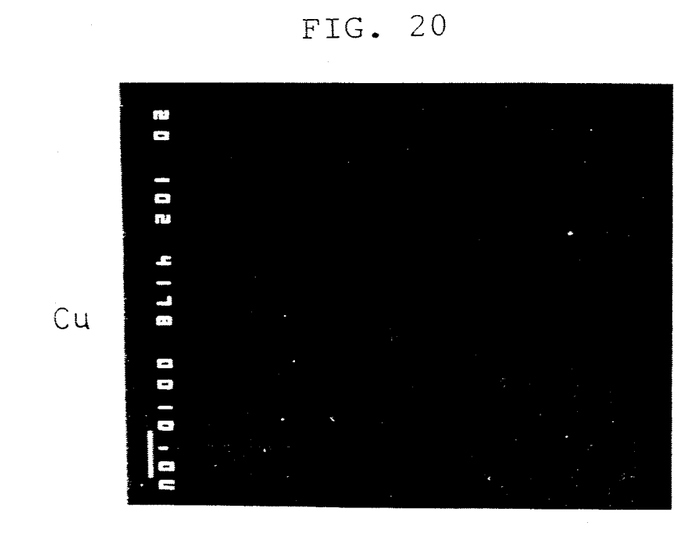

FIG. 15 shows an enlarged image of FIG. 14. Table 5 shows the composition of positions 1 through 6 in FIG. 15. Since position No. 7 in FIG. 15 is in the Ni plate 103, Table 5 excludes it. FIGS. 16 through 20 show the distribution of Ag, Ni, Ti, Pd and Cu, respectively.

TABLE 3

| SAMPLE NO. | | ROOM TEMPERATURE | | 400° C. | |
|---|---|---|---|---|---|
| | | STRENGTH (kg/mm$^2$) | BROKEN POSITION | STRENGTH (kg/mm$^2$) | BROKEN POSITION |
| EMBOD- IMENT | 1 | 38 | C | 25 | C, C/S |
| | 2 | 38 | SAME AS ABOVE | 28 | SAME AS ABOVE |
| | 3 | 43 | SAME AS ABOVE | 31 | SAME AS ABOVE |
| | 4 | 35 | SAME AS ABOVE | 26 | SAME AS ABOVE |
| | 5 | 41 | SAME AS ABOVE | 27 | SAME AS ABOVE |
| | 6 | 39 | SAME AS ABOVE | 32 | SAME AS ABOVE |
| | 7 | 41 | SAME AS ABOVE | 30 | SAME AS ABOVE |
| | 8 | 44 | SAME AS ABOVE | 35 | SAME AS ABOVE |
| | 9 | 37 | SAME AS ABOVE | 26 | SAME AS ABOVE |
| | 10 | 42 | SAME AS ABOVE | 35 | SAME AS ABOVE |
| | 11 | 40 | SAME AS ABOVE | 34 | SAME AS ABOVE |
| | 12 | 40 | SAME AS ABOVE | 28 | SAME AS ABOVE |
| COM- PAR- ISON DATA | 1 | 15 | C/S | 15 | C/S |
| | 2 | 40 | C | 21 | SAME AS ABOVE |
| | 3 | 20 | C, C/S | 10 | SAME AS ABOVE |
| | 4 | 34 | SAME AS ABOVE | 13 | SAME AS ABOVE |
| | 5 | 18 | SAME AS ABOVE | 8 | SAME AS ABOVE |
| | 6 | 20 | SAME AS ABOVE | 11 | SAME AS ABOVE |
| | 7 | 26 | SAME AS ABOVE | 10 | SAME AS ABOVE |
| | 8 | 25 | SAME AS ABOVE | 13 | SAME AS ABOVE |

NOTES
C: ceramic
C/S: interface of ceramic and intermediate layer

This combination of metals eases thermal stress in ceramic. The second embodiment can also be applied to the joining of ceramic and stainless steel that has a different coefficient of thermal expansion from ceramic.

Figure 7:
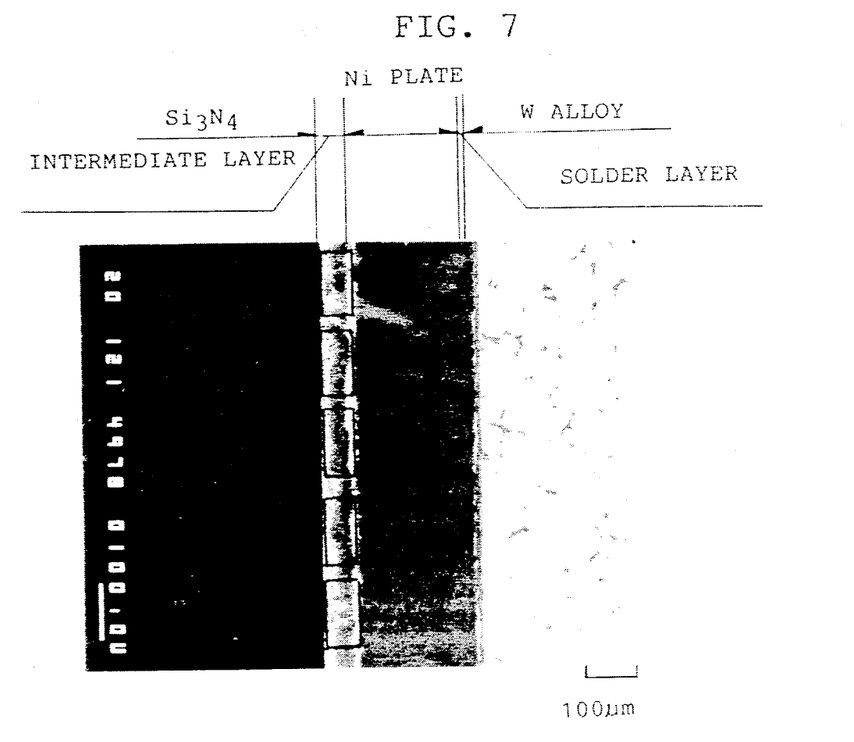
FIGS. 7 is a secondary electron image photo of the metallic composition of the intermediate layer.
Figure 8:
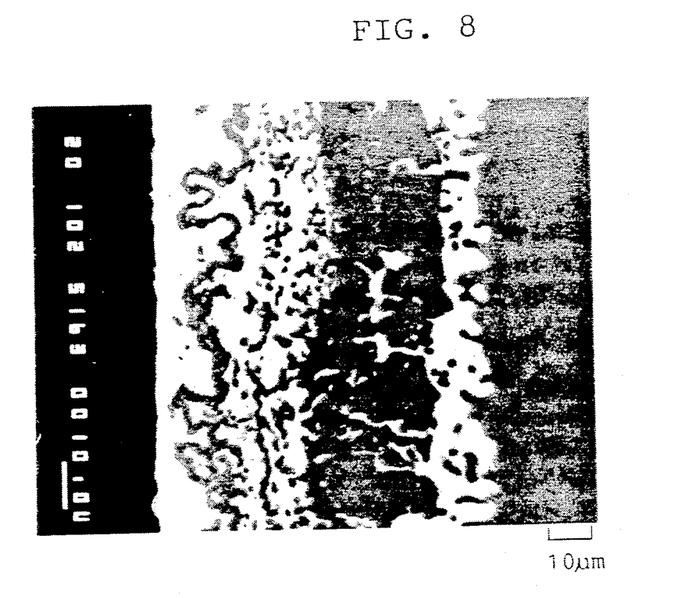
FIG. 8 is an enlarged view of FIG. 7.
Figure 9:
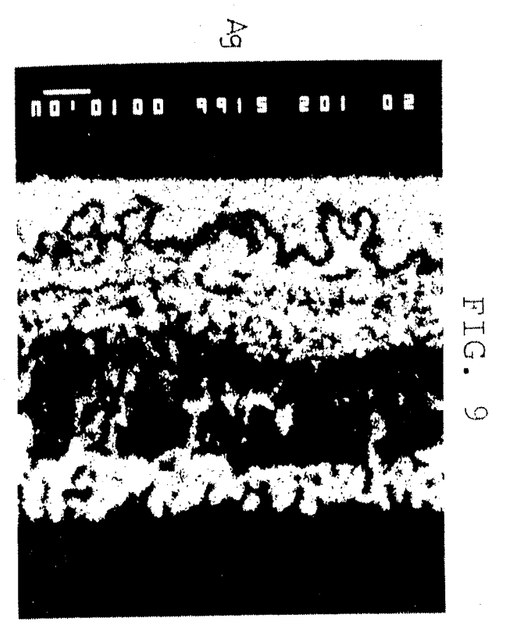
FIGS. 9 through 13 are characteristic X-ray image photos showing the distribution of Ag, Ni, Ti, Pd and Cu in the intermediate layer, respectively.
Figure 10:
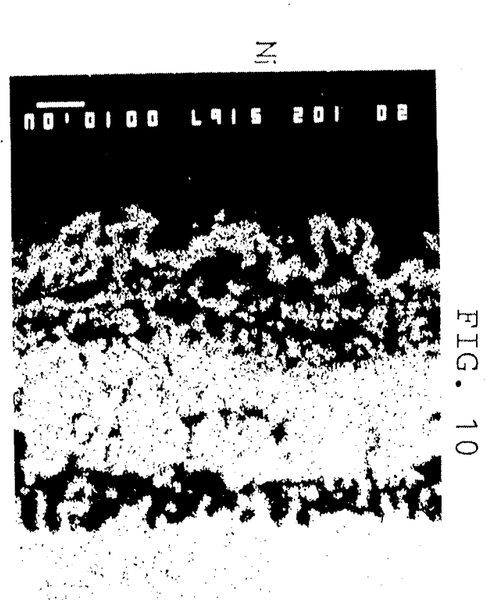
Figure 11:
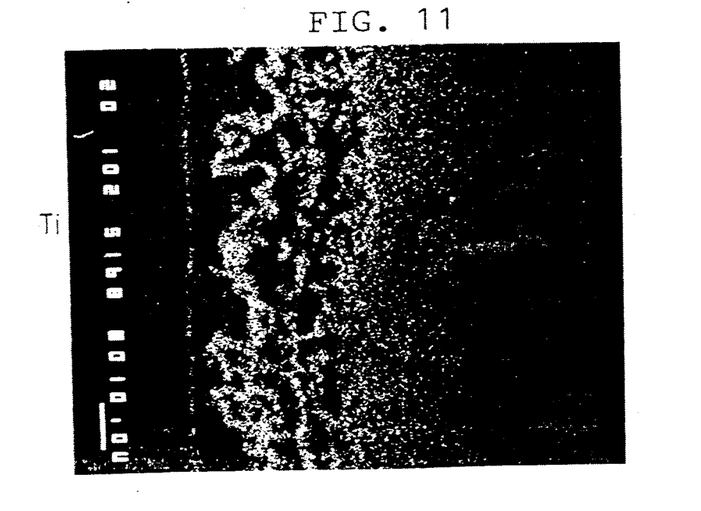
Figure 12:
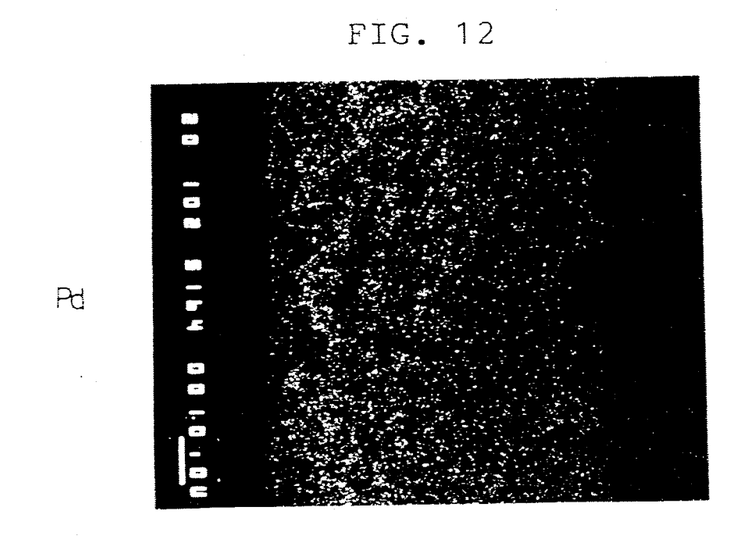
Figure 13:
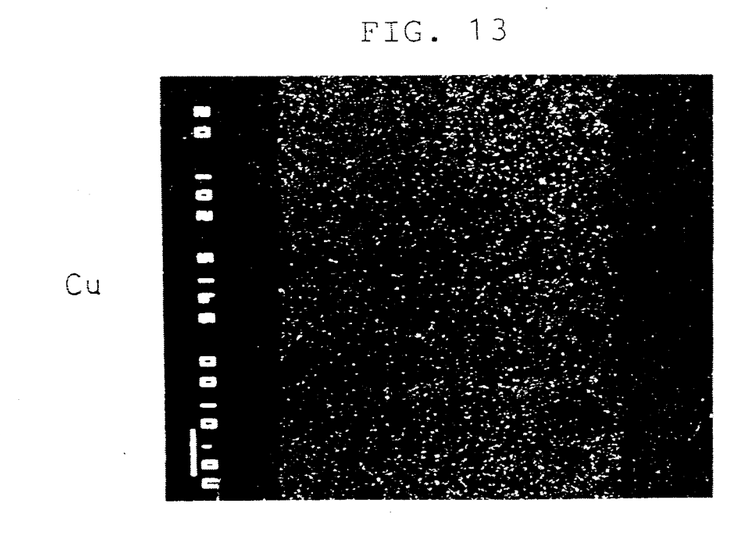

On the same way as the first embodiment, the composition of the intermediate layer and the distribution of elements in the intermediate layer are analyzed using the XMA. The results of analyzing Sample No. 8 for the second embodiment in Table 3 are shown in Table 4 and FIGS. 7 through 13. The secondary electron image photo of FIG. 7 shows the joined body through the intermediate member 107. Table 4 shows the analysis results of positions 1 through 5 delineated by rectangles in FIG. 7. FIG. 8 is an enlarged view of FIG. 7, and FIGS. 9 through 13 show the distribution of Ag, Ni, Ti, Pd and Cu, respectively.

TABLE 4

| POSITION NO. | COMPOSITION (% BY WEIGHT) | | | | |
|---|---|---|---|---|---|
| | Ag | Cu | Pd | Ni | Ti |
| 1 | 58.07 | 4.54 | 5.78 | 28.73 | 2.87 |
| 2 | 57.56 | 4.08 | 6.10 | 28.61 | 3.65 |
| 3 | 53.58 | 3.90 | 6.59 | 31.57 | 4.35 |
| 4 | 58.08 | 4.52 | 5.67 | 28.57 | 3.16 |
| 5 | 56.56 | 3.61 | 6.33 | 30.27 | 3.28 |
| Average | 56.77 | 4.13 | 6.09 | 29.55 | 3.46 |

Table 5 and FIGS. 14 through 20 show the analysis results of Sample No. 11 for the second embodiment in Table 3. FIG. 14 shows the intermediate layer, and

TABLE 5

| POSITION NO. | COMPOSITION (% BY WEIGHT) | | | | |
|---|---|---|---|---|---|
| | Ag | Cu | Pd | Ni | Ti |
| 1 | 92.55 | 0.26 | 5.85 | 0.61 | 0.73 |
| 2 | 5.73 | 0.58 | 10.19 | 64.73 | 18.77 |
| 3 | 92.74 | 0.05 | 6.59 | 0.33 | 0.60 |
| 4 | 4.55 | 0.18 | 9.92 | 67.16 | 18.19 |
| 5 | 1.29 | 0.46 | 3.32 | 89.95 | 4.97 |
| 6 | 91.69 | 0.03 | 5.77 | 1.97 | 0.53 |
| Average | 48.09 | 0.26 | 6.89 | 37.46 | 7.30 |

As shown in Tables 4 and 5, the intermediate layer has nonuniform composition. As shown in FIG. 15, five or more positions in the intermediate layer should be analyzed and averaged to obtain the composition of the intermediate layer. As shown in FIG. 7, it is desirable that beam should be enlarged almost equal to the thickness of the intermediate layer. In this case, five or more parallel positions in the intermediate layer should also be analyzed and averaged to ascertain the composition of the intermediate layer.

EMBODIMENT 3

To test the resistance to oxidation of the intermediate layer of the joined ceramic and metal for the present invention, flexure test pieces are prepared in the same way as the first embodiment. After the test pieces are kept in the atmosphere at 500° C. for one hundred hours, a four-point bending test is conducted at room temperature. Table 6 shows this oxidation test result.

TABLE 6

| SAMPLE NO. | | INTERMEDIATE LAYER COMPOSITION (% BY WEIGHT) | | | | | INITIAL STRENGTH (kg/mm$^2$) | STRENGTH AFTER OXIDATION TEST (kg/mm$^2$) |
|---|---|---|---|---|---|---|---|---|
| | | Ag | Cu | Pd | Ni | Ti | | |
| EMBOD- IMENT | 1 | 64 | — | 1 | 30 | 5 | 38 | 28 |
| | 2 | 45 | — | 20 | 30 | 5 | 38 | 32 |
| | 3 | 67 | — | 5 | 23 | 5 | 43 | 31 |
| | 4 | 40 | — | 20 | 39 | 1 | 35 | 30 |

TABLE 6-continued

| SAMPLE NO. | INTERMEDIATE LAYER COMPOSITION (% BY WEIGHT) | | | | | INITIAL STRENGTH (kg/mm$^2$) | STRENGTH AFTER OXIDATION TEST (kg/mm$^2$) |
|---|---|---|---|---|---|---|---|
| | Ag | Cu | Pd | Ni | Ti | | |
| 5 | 68 | — | 10 | 12 | 10 | 41 | 35 |
| 6 | 21 | 8 | 8 | 58 | 5 | 39 | 33 |
| 7 | 45 | 10 | 10 | 30 | 5 | 41 | 27 |
| 8 | 57 | 4 | 6 | 29.5 | 3.5 | 44 | 30 |
| 9 | 46 | 0.5 | 19 | 27 | 7.5 | 37 | 29 |
| 10 | 32.5 | — | 10 | 50 | 7.5 | 42 | 36 |
| 11 | 48 | — | 6.5 | 38 | 7.5 | 40 | 31 |
| 12 | 50 | 2 | 5 | 40 | 3 | 40 | 29 |
| COMPARISON 1 | 63 | 25 | — | 10 | 2 | 40 | 12 |
| COMPARISON 2 | 58 | 12 | 5 | 23 | 2 | 40 | 21 |
| COMPARISON 3 | 40 | 25 | 7 | 25 | 3 | 43 | 14 |
| COMPARISON 4 | 30 | 40 | 8 | 14 | 8 | 36 | 10 |
| COMPARISON 5 | 70 | 20 | 1 | 8 | 1 | 38 | 13 |
| COMPARISON 6 | 45 | 20 | 20 | 5 | 10 | 35 | 17 |

As shown in Table 6, samples for the third embodiment show great joining strength even after the oxidation test.

On the other hand, samples as comparison data are remarkably deteriorated after the oxidation test. Broken samples are cut perpendicularly to a joining surface and their composition is observed. As a result, Cu is selectively oxidized, which causes deterioration.

The samples for the third embodiment are hardly oxidized. Since Sample No. 7 contains 10% by weight of Cu, it is slightly oxidized, but it is not deteriorated.

Since sample No 2 of the comparison data which contains 12% by weight of Cu, is deteriorated, the intermediate layer should contain 10% by weight or less of Cu.

Although specific embodiments of the invention have been described for the purpose of illustration, the invention is not limited to the embodiments illustrated and described. This invention includes all embodiments and modifications that come within the scope of the claims.

What is claimed is:

1. Joined ceramic and metal comprising:
   metal;
   ceramic; and
   an intermediate layer joining the ceramic and metal, the intermediate layer composed of 20–70% by weight of silver, 1–20% by weight of palladium, 10–60% by weight of nickel and 1–10% by weight of titanium.

2. Joined ceramic an metal as in claim 1 in which the intermediate layer is further composed of 10% by weight or less of copper.

3. Joined ceramic and metal as in claim 1 in which the joined ceramic and metal is in the form of a valve.

4. Joined ceramic and metal as in claim 1 in which the joined ceramic and metal is in the form of a piston.

5. Joined ceramic and metal as in claim 1 in which the joined ceramic and metal is in the form of a turbo charger rotor.

6. Joined ceramic and metal as in claim 1 in which the joined ceramic and metal is in the form of a turbine.

7. Joined ceramic and metal as in claim 6 in which the intermediate layer is in the form of a joining portion between a ceramic turbine wheel and a metallic member of a ceramic turbine rotor.

8. Joined ceramic and metal as in claim 1 in which the intermediate layer comprises layers.

9. A valve comprising the joined ceramic and metal of claim 1.

10. A piston comprising the joined ceramic and metal as in claim 1.

11. A turbo charger rotor comprising the joined ceramic and metal as in claim 1.

12. A turbine comprising the joined ceramic and metal as in claim 1.

13. A turbine as in claim 12, wherein said intermediate layer is between a ceramic turbine wheel and a metallic member of a ceramic turbine rotor.

14. Joined ceramic and metal as in claim 1 in which the combined amount of silver, palladium, nickel and titanium of said intermediate layer comprises at least 90% by weight of said intermediate layer.

15. Joined ceramic and metal comprising:
   metal;
   ceramic; and
   an intermediate layer joining the ceramic and metal, the intermediate layer consisting essentially of silver, palladium, nickel and titanium, wherein said silver is present in an amount of 20–70% by weight, said palladium is present in an amount of from 1–20% by weight, said nickel is present in an amount of from 10–60% by weight and said titanium is present in an amount of from 1–10% by weight.

16. Joined ceramic and metal as in claim 15 in which the intermediate layer is further composed of copper, and said copper is present in an amount of 10% by weight or less.

* * * * *